(No Model.)
F. COYKENDALL.
BICYCLE TIRE.
No. 593,351. Patented Nov. 9, 1897.
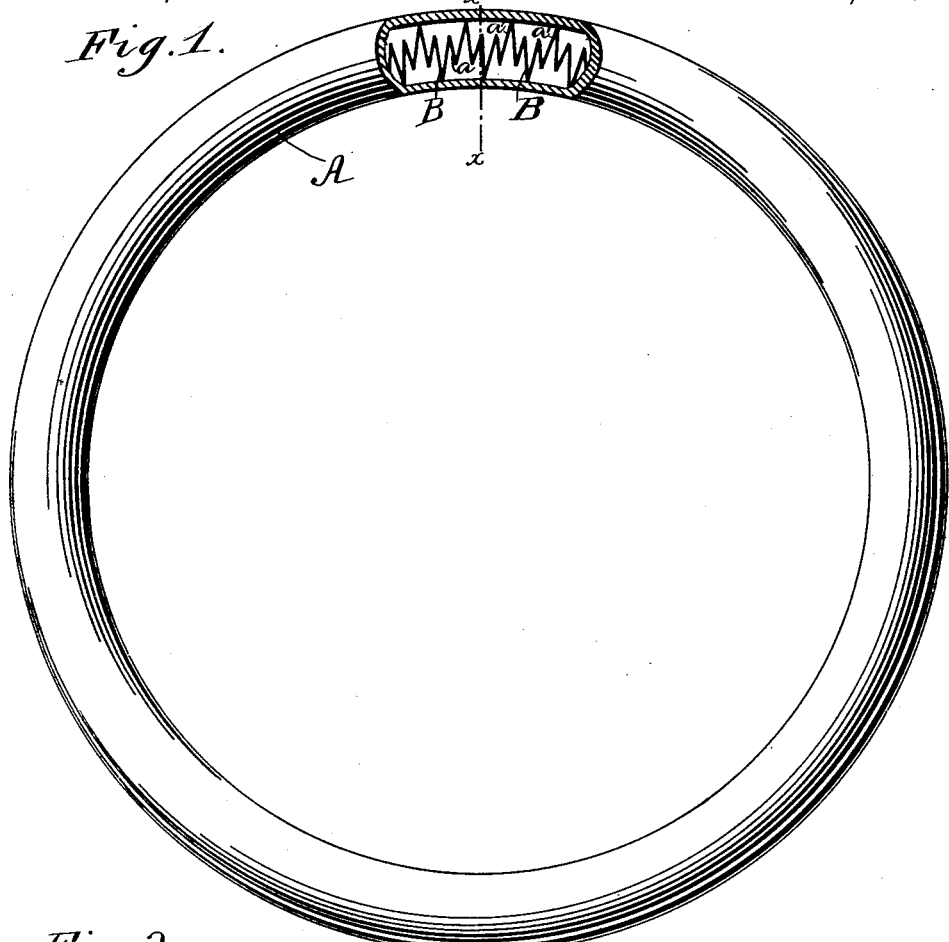
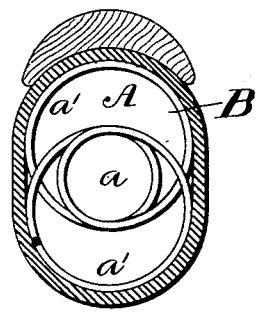
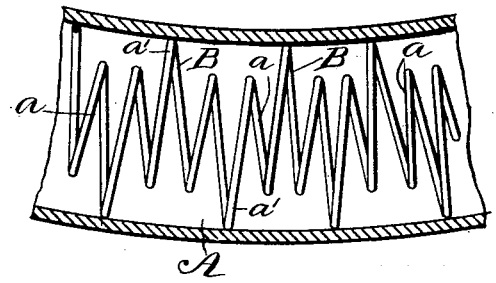
WITNESSES:
INVENTOR
F. Coykendall
BY
ATTORNEYS

UNITED STATES PATENT OFFICE.

FREDERICK COYKENDALL, OF NEW YORK, N. Y.

BICYCLE-TIRE.

SPECIFICATION forming part of Letters Patent No. 593,351, dated November 9, 1897.

Application filed March 15, 1897. Serial No. 627,457. (No model.)

*To all whom it may concern:*

Be it known that I, FREDERICK COYKENDALL, a citizen of the United States, and a resident of New York city, county of New York, and State of New York, have invented certain new and useful Improvements in Bicycle-Tires, of which the following is a specification, reference being had to the accompanying drawings, forming a part thereof, in which similar letters of reference indicate corresponding parts.

This invention relates to that class of bicycle-tires which embody a rubber or elastic tube within which is mounted a coiled-spring mechanism.

The object of my invention is to provide a simple and improved device of this character in which the full tension of the inclosed spring will be most effectively secured and which will, furthermore, possess advantages in point of elasticity, durability, positive operation, and general efficiency.

In the drawings, Figure 1 is a perspective view, partly in section, of a tire embodying my improvements. Fig. 2 is a detail sectional view taken on a longitudinal plane and showing the inclosed plane. Fig. 3 is a detail transverse sectional view.

Referring to the drawings, A designates the tube or shoe, which may be constructed of rubber or other suitable elastic material and is preferably of elliptical form in cross-section.

B designates my improved coil-spring, which is continuously arranged within the elastic tube A and may be formed of a single piece of wire.

The spring A comprises a double alternately-coiled construction embodying a central series of small coils $a$, intermediately between which are formed larger coils $a'$, which project laterally with respect to the central smaller coils, said larger coils $a'$ being also arranged to project alternately and respectively at opposite sides of the smaller central coils.

Both the central series of smaller coils $a$ and the alternate oppositely-projecting larger coils $a'$ project transversely with relation to the inclosing tubular shoe or tire A, but the relative arrangement is such that the larger projecting coils $a'$ extend in a direct line or plane with relation to the tread of the inclosing tire or shoe A.

The operation and advantages of my improvement will be readily understood.

In the improved relative arrangement of the coils of the inclosed spring as comprised in my invention and improvements, embodying the central series of smaller coils $a$ and the alternately-arranged intermediate series of oppositely-projecting larger coils $a'$, all of which coils are in transverse relation with respect to the inclosing tubular tire or shoe, the central series of small coils form a cushion, receiving the action of the series of alternate projecting larger outer coils $a'$, by which improved construction and arrangement the full tension or resiliency of the spring is insured.

Having thus described my invention, what I claim as new, and desire to secure by Letters Patent, is—

1. An improved bicycle-tire of the class described, comprising the inclosing tubular tire or shoe, and the double alternately-coiled spring embodying the central series of smaller coils intermediately between which are arranged the larger coils projecting alternately in opposite directions, all the coils being in transverse relation with respect to the inclosing tube, substantially as and for the purpose set forth.

2. An improved bicycle-tire of the class described, comprising the elliptical inclosing tire or shoe, and the double alternately-coiled spring embodying the central series of smaller coils intermediately between which are arranged larger coils projecting alternately in opposite directions, all the coils being in transverse relation with respect to the inclosing tube and the intermediate oppositely-projecting larger coils being in a tread line or plane with relation to the tread of the elliptical inclosing tube, substantially as and for the purpose set forth.

In testimony that I claim the foregoing as my invention I have signed my name, in presence of two witnesses, this 10th day of March, 1897.

FREDERICK COYKENDALL.

Witnesses:
  C. SEDGWICK,
  B. McCOMB.